United States Patent
Consoli et al.

(10) Patent No.: US 11,943,095 B2
(45) Date of Patent: Mar. 26, 2024

(54) FIRST NETWORK NODE AND A SECOND NETWORK NODE FOR COORDINATION OF NETWORK FUNCTION CONSUMERS

(71) Applicant: Huawei Technologies Co., Ltd., Shenzhen (CN)

(72) Inventors: Antonio Consoli, Kista (SE); Siva Vakeesar, Kista (SE); Ali Hamidian, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 12 days.

(21) Appl. No.: 17/810,402

(22) Filed: Jul. 1, 2022

(65) Prior Publication Data
US 2022/0337474 A1    Oct. 20, 2022

Related U.S. Application Data

(63) Continuation of application No. PCT/EP2020/050060, filed on Jan. 3, 2020.

(51) Int. Cl.
*H04L 41/0894* (2022.01)
*H04L 41/0604* (2022.01)
*H04L 41/0686* (2022.01)

(52) U.S. Cl.
CPC ...... *H04L 41/0686* (2013.01); *H04L 41/0604* (2013.01); *H04L 41/0894* (2022.05)

(58) Field of Classification Search
None
See application file for complete search history.

(56) References Cited

U.S. PATENT DOCUMENTS

| | | | |
|---|---|---|---|
| 2004/0153506 A1* | 8/2004 | Ito | H04W 4/023 709/204 |
| 2008/0022409 A1* | 1/2008 | Hondo | H04L 63/0478 726/26 |

(Continued)

FOREIGN PATENT DOCUMENTS

| | | |
|---|---|---|
| WO | 2020147927 A1 | 7/2020 |
| WO | 2020224755 A1 | 11/2020 |
| WO | 2020253934 A1 | 12/2020 |

OTHER PUBLICATIONS

CATT et al., "Update to Abnormal behaviour related network data analytics", 3GPP TSG-SA WG2 Meeting #132, S2-1904796, Xi'an, China, Apr. 8-12, 2019, 6 pages.

(Continued)

*Primary Examiner* — Joshua Joo
(74) *Attorney, Agent, or Firm* — Slater Matsil, LLP

(57) ABSTRACT

The invention relates to coordination of network function, NF, consumers subscribing to analytics events from a second network node. According to embodiments of the invention procedures for suppressing the notification related to an analytics event for specific NF consumers are introduced. The procedures are performed between a first network node and the second network node, where the first network node 100 may be seen as a controlling function and the second network node may be seen as a controlled function. The procedures are based on a list of NF consumers subscribing to an analytics event and their respective notification status associated with the analytics event. Depending on the list of NF consumers, the second network node may transmit or suppress notifications associated with the analytics event to the NF consumers.

20 Claims, 9 Drawing Sheets

(56) References Cited

U.S. PATENT DOCUMENTS

| | | | |
|---|---|---|---|
| 2008/0201451 A1* | 8/2008 | Yu | H04L 65/613 709/219 |
| 2020/0288296 A1* | 9/2020 | Fiorese | H04W 64/006 |
| 2021/0211976 A1* | 7/2021 | Salkintzis | H04W 4/50 |

OTHER PUBLICATIONS

Krakowiak, S., "Middleware Architecture with Patterns and Frameworks", Distributed under a Creative Commons license, http://creativecommons,org/license/by-nc-nd/3.0/, Feb. 27, 2009, 437 pages.

Huawei, "Abnormal behaviour analytics", TSG-CT WG3 Meeting #106, C3-194062, Portoroz, Slovenia, Oct. 7-11, 2019, 24 pages.

LG Electronics et al., "Solution#29 update", 3GPP TSG-SA WG2 Meeting #132, S2-1904450, Xi'an, China, Apr. 8-12, 2019, 5 pages.

Huawei et al., "Clarifications on Potential QoS Change", 3GPP TSG-SA WG2 Meeting #134, S2-1908221, Sapporo, Japan, Jun. 24-28, 2019, 5 pages.

3GPP TS 23.287 V16.1.0 (Dec. 2019) 3rd Generation Partnership Project; Technical Specification Group Services and System Aspects; Architecture enhancements for 5G System (5GS) to supportVehicle-to-Everything (V2X) services (Release 16), 51 pages.

3GPP TS 23.288 V0.4.0 (Apr. 2019), 3rd Generation Partnership Project; Technical Specification Group Services and System Aspects; Architecture enhancements for 5G System (5GS) to support network data analytics services (Release 16), 48 pages.

3GPP TS 23.288 V16.1.0 (Sep. 2019), 3rd Generation Partnership Project; Technical Specification Group Services and System Aspects; Architecture enhancements for 5G System (5GS) to support network data analytics services (Release 16), 52 pages.

3GPP TS 23.501 V16.3.0 (Dec. 2019), 3rd Generation Partnership Project; Technical Specification Group Services and System Aspects; System architecture for the 5G System (5GS); Stage 2 (Release 16), 417 pages.

3GPP TS 23.502 V16.3.0 (Dec. 2019), 3rd Generation Partnership Project; Technical Specification Group Services and System Aspects; Procedures for the 5G System (5GS); Stage 2 (Release 16), 558 pages.

3GPP TS 23.503 V16.3.0 (Dec. 2019), 3rd Generation Partnership Project; Technical Specification Group Services and System Aspects; Policy and charging control framework for the 5G System (5GS); Stage 2 (Release 16), 112 pages.

\* cited by examiner

FIRST NETWORK NODE AND A SECOND NETWORK NODE FOR COORDINATION OF NETWORK FUNCTION CONSUMERS

CROSS-REFERENCE TO RELATED APPLICATIONS

This application is a continuation of International Patent Application No. PCT/EP2020/050060, filed on Jan. 3, 2020, the disclosure of which is hereby incorporated by reference in its entirety.

TECHNICAL FIELD

The invention relates to a first network node and a second network node for coordination of potential actions of network function consumers subscribing to analytics in relation to the analytics received. Furthermore, the invention also relates to corresponding methods and a computer program.

BACKGROUND

3GPP introduced a number of analytics provided by the network data analytics function (NWDAF) enabler which could be potentially received by multiple network function (NF) consumers at the same time. The NF consumers could be of the same type, e.g. multiple instances of the same NF such as a session management function (SMF). Alternatively, the NF consumers could be of different types, e.g. different NFs or entities such as an application function (AF), a SMF, or a user equipment (UE). For example, quality-of-service (QoS) sustainability analytics could potentially be consumed by multiple NF consumers such as one or multiple instances of AFs, e.g. vehicle-to-anything (V2X) application servers, or one or multiple instances of the same NF, e.g. a SMF or an AMF, or a combination of the above.

Some of the analytics, as in the case of QoS sustainability analytics, are used to trigger a specific action in the NF consumer, as described for example in the procedure for notification on potential QoS change to the V2X application server. In this case, the NWDAF analytics, i.e. the prediction by the NWDAF, is used to trigger an action that may involve specific application adaptation in preparation for a potential upcoming QoS change. As described in QoS sustainability analytics, predictions could also be consumed by a core network NF, e.g. an AMF/SMF/PCF, or RAN e.g. master node, enhanced node B (eNB) or next generation node B (gNB), to enable some form of network reaction. For example, a predicted QoS deterioration may be compensated by the network, either by initiating dual connectivity or by implementing traffic redundancy. RAN may also consume QoS predictions to implement reaction to predicted coverage changes, e.g. switch from normal coverage to coverage enhancements. The reactions may be application led or network led.

SUMMARY

An objective of embodiments of the invention is to provide a solution which mitigates or solves the drawbacks and problems of conventional solutions.

The above and further objectives are solved by the subject matter of the independent claims. Further advantageous embodiments of the invention can be found in the dependent claims.

According to a first aspect of the invention, the above mentioned and other objectives are achieved with a first network node for a communication system, the first network node being configured to transmit a get list request message to a second network node, wherein the get list request message indicates a request for a list of network function, NF, consumers subscribing to an analytics event; receive a get list response message from the second network node, wherein the get list response message indicates a list of NF consumers and their respective notification status associated with the analytics event, wherein each NF consumer in the list is set to a first status in which the NF consumer receives a first notification type indicating an action is needed to be performed by the NF consumer in respect of the analytics event or to a second status in which the NF consumer receives a second notification type inhibiting an action to be performed by the NF consumer in respect of the analytics event.

An advantage of the first network node according to the first aspect is that by introducing different status for different NF consumers, it is possible to set different views of the NF consumers related to the analytics. NF consumers that are supposed to perform an action in response to the analytics will receive the analytics as they are. NF consumers that are not supposed to react, receive the analytics "modified" in order to inhibit the action to be performed. Further, by exposing the order of the NF consumers in the list of NF consumers, the second network node exposes the order in which the NF consumers will receive the notifications. In this way, the first network node may modify the order if a different NF consumer is supposed to initiate action/act before another NF consumer, allowing the actions of the NF consumers to be coordinated.

In an implementation form of a first network node according to the first aspect, each NF consumer in the list is set to the first status, the second status or to a third status in which the NF consumer receives the first notification type and performs the action upon an acknowledgement of an action performed by a previous NF consumer in the list of NF consumers.

The acknowledgement of the action performed by the previous NF consumer may be indicated in a message received by the second network node from the previous NF consumer.

An advantage with this implementation form is that it is possible to send the analytics to an NF consumer and hence trigger the action in that NF consumer only after the acknowledgment is received from a previous NF consumer. In this way, the second NF consumer action is made subordinated according to the outcome of the action of the first NF consumer. Thereby, the actions of the NF consumers can be further controlled and coordinated.

In an implementation form of a first network node according to the first aspect, the NF consumers are ordered in a chronological order in the list of NF consumers for receiving notifications.

An advantage with this implementation form is that the first network node can control and modify the order of the NF consumers and their status in the list of NF consumers and hence the actions of the NF consumers.

In an implementation form of a first network node according to the first aspect, the first network node is further configured to transmit a set list request message to a second network node, wherein the set list request message indicates a chronological order of NF consumers in a list for receiving notifications and their respective status; receive a set list response message from the second network node, wherein the set list response message indicates an acknowledgement or a negative acknowledgement response to the set list request message.

An advantage with this implementation form is that the first network node can control and modify the order of the NF consumers and their status in the list of NF consumers and hence the actions of the NF consumers. Furthermore, the second network node can accept or reject any changes to the list of NF consumers.

In an implementation form of a first network node according to the first aspect, the first network node is further configured to receive a policy request message from the second network node, wherein the policy request message indicates a request for a policy associated with a list of NF consumers; establish a policy associated with the list of NF consumers; transmit a policy response message the second network node, wherein the policy response message indicates the established policy associated with the list of NF consumers.

An advantage with this implementation form is that the second network node can set the order and status of NF consumers autonomously according to the policy received from the first network node. Thereby, reducing signaling between the first network node and the second network node.

In an implementation form of a first network node according to the first aspect, the first network node is further configured to update a policy associated with a list of NF consumers; transmit a policy update message to the second network node, wherein the policy update message indicates the updated policy associated with the list of NF consumers.

An advantage with this implementation form is that it provides flexibility in the handling of the policy and allows a previously generated policy to be updated while the second network node is operating.

In an implementation form of a first network node according to the first aspect, the first network node is further configured to receive a policy update request message from the second network node, wherein the policy update request message indicates a request for a policy update associated with a list of NF consumers; update a policy associated with the list of NF consumers; transmit a policy update response message to the second network node, wherein the policy update response message indicates the updated policy associated with the list of NF consumers.

An advantage with this implementation form is that it provides flexibility in the handling of the policy and allows a previously generated policy to be updated while the second network node is operating.

In an implementation form of a first network node according to the first aspect, the first network node is further configured to receive a terminate policy request message from the second network node, wherein the terminate policy request message indicates termination of a policy associated with a list of NF consumers; terminate the policy associated with the list of NF consumers; transmit a terminate policy response message to the second network node, wherein the terminate policy response message indicates the termination of the policy associated with the list of NF consumers.

An advantage with this implementation form is that it provides flexibility in the handling of the policy and allows a previously generated policy to be removed or replaced.

According to a second aspect of the invention, the above mentioned and other objectives are achieved with a second network node for a communication system, the second network node being configured to receive a get list request message from a first network node, wherein the get list request message indicates a request for a list of NF consumers subscribing to an analytics event; determine a list of NF consumers and their respective notification status associated with the subscribed analytics event, wherein each NF consumer in the list is set to a first status in which the NF consumer receives a first notification type indicating an action is needed to be performed by the NF consumer in respect of the analytics event or to a second status in which the NF consumer receives a second notification type inhibiting an action to be performed by the NF consumer in respect of the analytics event; transmit a get list response message to the first network node, wherein the get list response message indicates the determined list of NF consumers and their respective notification status associated with the subscribed analytics event.

An advantage of the second network node according to the second aspect is that by introducing different status for different NF consumers, it is possible to set different views of the NF consumers related to the analytics. NF consumers that are supposed to perform an action in response to the analytics will receive the analytics as they are. NF consumers that are not supposed to react, receive the analytics "modified" in order to inhibit the action to be performed. Further, by exposing the order of the NF consumers in the list of NF consumers, the second network node exposes the order in which the NF consumers will receive the notifications. In this way, the first network node may modify the order if a different NF consumer is supposed to initiate action/act before another NF consumer, allowing the actions of the NF consumers to be coordinated.

In an implementation form of a second network node according to the second aspect, the second network node is further configured to transmit the first notifications and the second notifications to the NF consumers according to the list of NF consumers.

An advantage with this implementation form is that the NF consumers will receive notifications related to the analytics according to their status in the list of NF consumers. Thereby, the actions of the NF consumers in response to the analytics can be controlled and coordinated.

In an implementation form of a second network node according to the second aspect, each NF consumer in the list is set to the first status, the second status or to a third status in which the NF consumer receives the first notification type and performs the action upon an acknowledgement of an action performed by a previous NF consumer in the list of NF consumers.

An advantage with this implementation form is that it is possible to send the analytics to an NF consumer and hence trigger the action in that NF consumer only after the acknowledgment is received from a previous NF consumer. In this way, the second NF consumer action is made subordinated according to the outcome of the action of the first NF consumer. Thereby, the actions of the NF consumers can be further controlled and coordinated.

In an implementation form of a second network node according to the second aspect, the NF consumers are ordered in a chronological order in the list of NF consumers for receiving notifications.

An advantage with this implementation form is that the first network node can control and modify the order of the NF consumers and their status in the list of NF consumers and hence the actions of the NF consumers.

In an implementation form of a second network node according to the second aspect, the second network node is further configured to receive a set list request message from the first network node, wherein the set list request message indicates a chronological order of NF consumers for receiving notifications and their respective status; determine the list of NF consumers based on the set list request message; determine an acknowledgement or a negative acknowledgement response based on the determined list of NF consumers; and transmit a set list response message to the first network node, wherein the set list response message indicates the acknowledgement or the negative acknowledgement response to the set list request message.

An advantage with this implementation form is that the first network node can control and modify the order of the NF consumers and their status in the list of NF consumers and hence the actions of the NF consumers. Furthermore, the second network node can accept or reject any changes to the list of NF consumers.

In an implementation form of a second network node according to the second aspect, the second network node is further configured to transmit a policy request message to the first network node, wherein the policy request message indicates a request for a policy associated with the list of NF consumers; receive a policy response message from the first network node, wherein the policy response message indicates a policy associated with the list of NF consumers; determine the list of NF consumers and their respective notification status based on the policy associated with the list of NF consumers.

In embodiments the second network node may further determine the list of NF consumers and their respective notification status based on the subscriptions received from the NF consumers.

An advantage with this implementation form is that the second network node can set the order and status of NF consumers autonomously according to the policy received from the first network node. Thereby, reducing signaling between the first network node and the second network node.

In an implementation form of a second network node according to the second aspect, the second network node is further configured to receive a policy update message from the first network node, wherein the policy update message indicates an updated policy; determine the list of NF consumers and their respective notification status based on the updated policy.

In embodiments the second network node may further determine the list of NF consumers and their respective notification status based on the subscriptions received from the NF consumers.

An advantage with this implementation form is that it provides flexibility in the handling of the policy and allows a previously generated policy to be updated while the second network node is operating.

In an implementation form of a second network node according to the second aspect, the second network node is further configured to transmit a policy update request message to the first network node, wherein the policy update request message indicates a request for an updated of a policy associated with the list of NF consumers; receive a policy update response message from the first network node, wherein the policy update response message indicates an updated policy associated with the list of NF consumers; and determine the list of NF consumers and their respective notification status based on the updated policy.

In embodiments the second network node may further determine the list of NF consumers and their respective notification status based on the subscriptions received from the NF consumers.

An advantage with this implementation form is that it provides flexibility in the handling of the policy and allows a previously generated policy to be updated while the second network node is operating.

In an implementation form of a second network node according to the second aspect, the second network node is further configured to transmit a terminate policy request message to the first network node, wherein the terminate policy request message indicates termination of a policy associated with the list of NF consumers; receive a terminate policy response message from the first network node, wherein the terminate policy response message indicates termination of a policy associated with the list of NF consumers; and terminate the policy associated with the list of NF consumers.

An advantage with this implementation form is that it provides flexibility in the handling of the policy and allows a previously generated policy to be removed or replaced.

According to a third aspect of the invention, the above mentioned and other objectives are achieved with a method for a first network node, the method comprises transmitting a get list request message to a second network node, wherein the get list request message indicates a request for a list of NF consumers subscribing to an analytics event; receiving a get list response message from the second network node, wherein the get list response message indicates a list of NF consumers and their respective notification status associated with the analytics event, wherein each NF consumer in the list is set to a first status in which the NF consumer receives a first notification type indicating an action is needed to be performed by the NF consumer in respect of the analytics event or to a second status in which the NF consumer receives a second notification type inhibiting an action to be performed by the NF consumer in respect of the analytics event.

The method according to the third aspect can be extended into implementation forms corresponding to the implementation forms of the first network node according to the first aspect. Hence, an implementation form of the method comprises the feature(s) of the corresponding implementation form of the first network node.

The advantages of the methods according to the third aspect are the same as those for the corresponding implementation forms of the first network node according to the first aspect.

According to a fourth aspect of the invention, the above mentioned and other objectives are achieved with a method for a second network node, the method comprises receiving a get list request message from a first network node, wherein the get list request message indicates a request for a list of NF consumers subscribing to an analytics event; determining a list of NF consumers and their respective notification status associated with the subscribed analytics event, wherein each NF consumer in the list is set to a first status in which the NF consumer receives a first notification type indicating an action is needed to be performed by the NF consumer in respect of the analytics event or to a second status in which the NF consumer receives a second notification type inhibiting an action to be performed by the NF consumer in respect of the analytics event; transmitting a get list response message to the first network node, wherein the get list response message indicates the determined list of NF consumers and their respective notification status associated with the subscribed analytics event.

The method according to the fourth aspect can be extended into implementation forms corresponding to the implementation forms of the second network node according to the second aspect. Hence, an implementation form of the method comprises the feature(s) of the corresponding implementation form of the second network node.

The advantages of the methods according to the fourth aspect are the same as those for the corresponding implementation forms of the second network node according to the second aspect.

The invention also relates to a computer program, characterized in program code, which when run by at least one processor causes said at least one processor to execute any method according to embodiments of the invention. Further, the invention also relates to a computer program product comprising a computer readable medium and said mentioned computer program, wherein said computer program is included in the computer readable medium, and comprises of one or more from the group: ROM (Read-Only Memory), PROM (Programmable ROM), EPROM (Erasable PROM), Flash memory, EEPROM (Electrically EPROM) and hard disk drive.

Further applications and advantages of the embodiments of the invention will be apparent from the following detailed description.

BRIEF DESCRIPTION OF THE DRAWINGS

The appended drawings are intended to clarify and explain different embodiments of the invention, in which.

DETAILED DESCRIPTION OF ILLUSTRATIVE EMBODIMENTS

In general, application or network reactions is triggered in the NF consumer when analytics is received. When there are multiple NF consumers for the same analytics filter information and analytics target period, potentially multiple NF consumer reactions may be triggered in parallel in an uncoordinated way for the same event. In this disclosure, "coordination" of actions of NF consumers can be defined as the methods and tools that allow several NF consumers to cooperate towards a common goal.

Uncoordinated reaction in multiple NF consumers is not always desirable, as the effect of such an incoordination may not be foreseen, with potential undesired effects both in the network and in the application.

The invention therefore addresses the issue of coordinating multiple NF consumers subscribing to the same analytics. The coordination of multiple NF consumers according to the invention is based on an inventive list of NF consumers subscribing to an analytics event and their respective notification status associated with the analytics event. The list of NF consumers is managed by a first network node and a second network node and enables the second network node to suppress an analytics event in notifications related to the analytics event for specific NF consumers.

Figure 1:
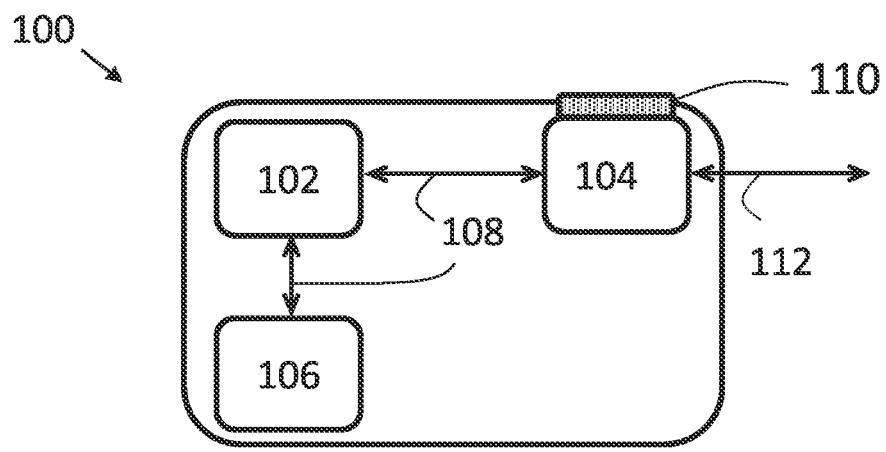
FIG. 1 shows a first network node according to an embodiment of the invention.

FIG. 1 shows a first network node 100 according to an embodiment of the invention. In the embodiment shown in FIG. 1, the first network node 100 comprises a processor 102, a transceiver 104 and a memory 106. The processor 102 is coupled to the transceiver 104 and the memory 106 by communication means 108 known in the art. The first network node 100 may be configured for both wireless and wired communications in wireless and wired communication systems, respectively. The wireless communication capability may be provided with an antenna or antenna array no coupled to the transceiver 104, while the wired communication capability may be provided with a wired communication interface 112 coupled to the transceiver 104.

That the first network node wo is configured to perform certain actions can in this invention be understood to mean that the first network node 100 comprises suitable means, such as e.g. the processor 102 and the transceiver 104, configured to perform said actions.

According to embodiments of the invention the first network node 100 is configured to transmit a get list request message 502 to a second network node 300, wherein the get list request message 502 indicates a request for a list of NF consumers subscribing to an analytics event. NF consumers subscribing to an analytics event can be understood to mean NF consumers which have subscribed to the analytics events from the second network node 300. The first network node 100 is further configured to receive a get list response message 504 from the second network node 300, wherein the get list response message 504 indicates a list of NF consumers and their respective notification status associated with the analytics event, wherein each NF consumer in the list is set to a first status in which the NF consumer receives a first notification type indicating an action is needed to be performed by the NF consumer in respect of the analytics event or to a second status in which the NF consumer receives a second notification type inhibiting an action to be performed by the NF consumer in respect of the analytics event. The order of the NF consumers in the list of NF consumers corresponds to the order in which the second network node 300 transmits notifications to the NF consumers.

Figure 2:
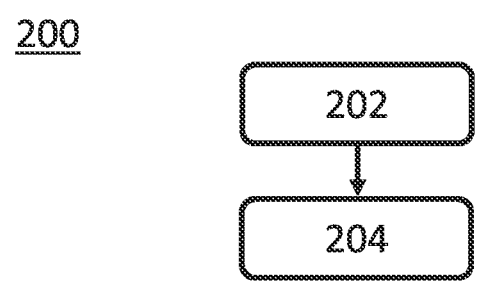
FIG. 2 shows a method for a first network node according to an embodiment of the invention.

FIG. 2 shows a flow chart of a corresponding method 200 which may be executed in a first network node 100, such as the one shown in FIG. 1. The method 200 comprises transmitting 202 a get list request message 502 to a second network node 300, wherein the get list request message 502 indicates a request for a list of NF consumers subscribing to an analytics event. The method 200 further comprises receiving 204 a get list response message 504 from the second network node 300, wherein the get list response message 504 indicates a list of NF consumers and their respective notification status associated with the analytics event, wherein each NF consumer in the list is set to a first status in which the NF consumer receives a first notification type indicating an action is needed to be performed by the NF consumer in respect of the analytics event or to a second status in which the NF consumer receives a second notification type inhibiting an action to be performed by the NF consumer in respect of the analytics event.

Figure 3:
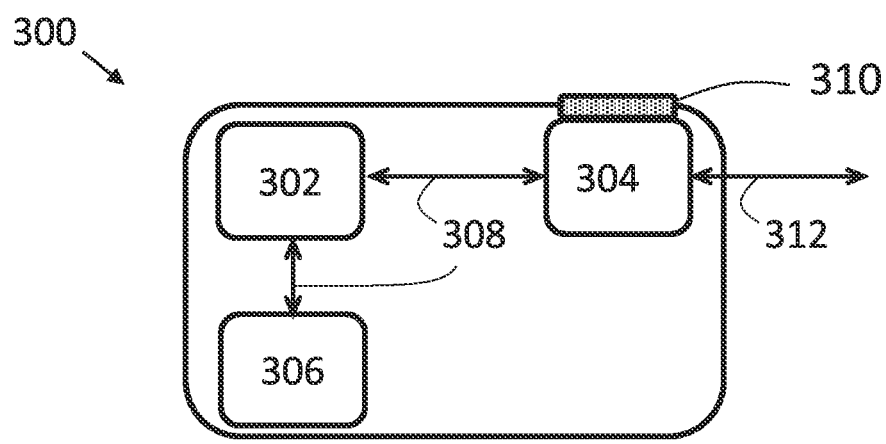
FIG. 3 shows a second network node according to an embodiment of the invention.

FIG. 3 shows a second network node 300 according to an embodiment of the invention. In the embodiment shown in FIG. 3, the second network node 300 comprises a processor 302, a transceiver 304 and a memory 306. The processor 302 is coupled to the transceiver 304 and the memory 306 by communication means 308 known in the art. The second network node 300 may be configured for both wireless and wired communications in wireless and wired communication systems, respectively. The wireless communication capability may be provided with an antenna or antenna array 310 coupled to the transceiver 304, while the wired communication capability may be provided with a wired communication interface 312 coupled to the transceiver 304.

That the second network node 300 is configured to perform certain actions can in this invention be understood to mean that the second network node 300 comprises suitable means, such as e.g. the processor 302 and the transceiver 304, configured to perform said actions.

According to embodiments of the invention the second network node 300 is configured to receive a get list request message 502 from a first network node 100, wherein the get list request message 502 indicates a request for a list of NF consumers subscribing to an analytics event. NF consumers subscribing to an analytics event can be understood to mean NF consumers which have subscribed to the analytics events from the second network node 300. The second network node 300 is further configured to determine a list of NF consumers and their respective notification status associated with the subscribed analytics event, wherein each NF consumer in the list is set to a first status in which the NF consumer receives a first notification type indicating an action is needed to be performed by the NF consumer in respect of the analytics event or to a second status in which the NF consumer receives a second notification type inhibiting an action to be performed by the NF consumer in respect of the analytics event. Furthermore, the second network node 300 is configured to transmit a get list response message 504 to the first network node 100, wherein the get list response message 504 indicates the determined list of NF consumers and their respective notification status associated with the subscribed analytics event.

Figure 4:
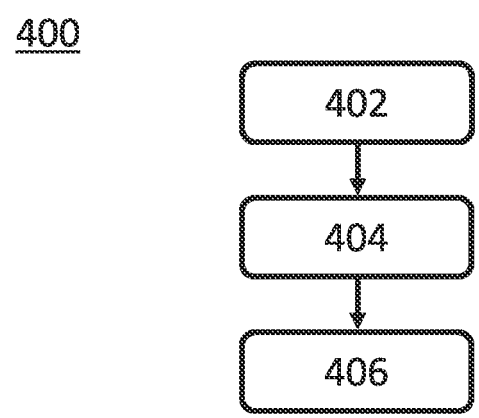
FIG. 4 shows a method for a second network node according to an embodiment of the invention.

FIG. 4 shows a flow chart of a corresponding method 400 which may be executed in a second network node 300, such as the one shown in FIG. 3. The method 400 comprises receiving 402 a get list request message 502 from a first network node 100, wherein the get list request message 502 indicates a request for a list of NF consumers subscribing to an analytics event. The method 400 further comprises determining 404 a list of NF consumers and their respective notification status associated with the subscribed analytics event, wherein each NF consumer in the list is set to a first status in which the NF consumer receives a first notification type indicating an action is needed to be performed by the NF consumer in respect of the analytics event or to a second status in which the NF consumer receives a second notification type inhibiting an action to be performed by the NF consumer in respect of the analytics event. Furthermore, the method 400 comprises transmitting 406 a get list response message 504 to the first network node 100, wherein the get list response message 504 indicates the determined list of NF consumers and their respective notification status associated with the subscribed analytics event.

Figure 5:
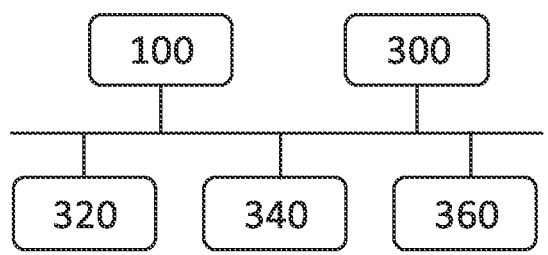
FIG. 5 shows a communication system according to an embodiment of the invention.

FIG. 5 shows a communication system 500 according to embodiments of the invention. The communication system 500 comprises the first network node 100 and the second network node 300 configured to communicate with each other. The first network node 100 and the second network node 300 may e.g. exchange information related to NF consumers and their notification status with each other. The second network node 300 is further configured to provide network data analytics to NF consumers such as e.g. QoS sustainability analytics. In the embodiment shown in FIG. 5, the communication system 500 further comprises a first NF consumer 320, a second NF consumer 340, and a third NF consumer 360. The NF consumers 320, 340, 360 may request and/or subscribe to the same network data analytics or different network data analytics.

In embodiments, the first network node 100 may be a policy control function (PCF) and the second network node 300 may be a network data analytics function (NWDAF) as defined in the 3GPP standard. In this case, the NF consumers may e.g. be session management functions (SMFs), access and management functions (AMFs), policy control functions (PCFs), application functions (AFs), radio access networks (RANs), or user equipments (UEs) as defined in the 3GPP standard. Some of those NF Consumers may not yet have a specified interface to the NWDAF. For example, the RAN currently does not have a reference point to the NWDAF for requesting or subscribing to analytics. Furthermore, some NF consumers such as the AF may not have a direct interface to the NWDAF. The AF may instead request or subscribe to analytics via a network exposure function (NEF).

When the first network node 100 is a PCF and the second network node 300 is a NWDAF, there is no need of any additional interface/reference point for the solution according to the invention. The relevant services on the first network node 100 can be exposed via the existing Npcf reference point for the PCF and the services on the second network node 300 can be exposed via the existing Nnwdaf reference point for the NWDAF.

Figure 6:
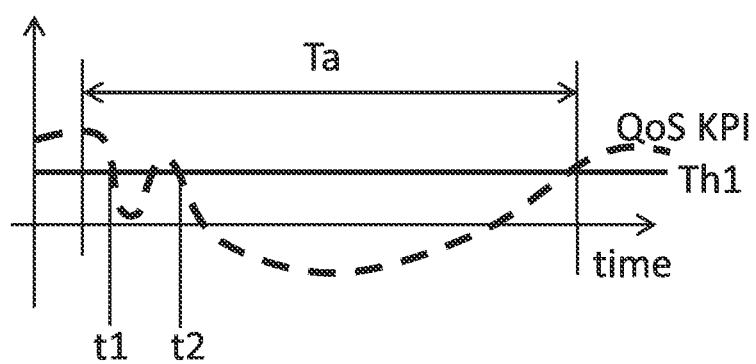
FIG. 6 shows triggering of analytics events according to an embodiment of the invention.

The NF consumers may subscribe to one or more analytics event from the second network node 300. An analytics event is an event that triggers the second network node 300 to send a notification to NF consumers that have subscribed to the analytics event. FIG. 6 shows an example of triggering of analytics events for QoS sustainability analytics. The analytics event is related to a threshold value for a QoS key performance indicator (KPI). An analytics event is triggered for every specific interval in which the QoS KPI crosses the threshold value in a predefined critical direction. The critical direction may depend on the QoS KPI. For example, throughput critical direction is when the QoS KPI is lower than the threshold value, while latency critical direction is when latency is higher than the threshold value. Over an analytics target period there may be several analytics events for a specific threshold.

With reference to FIG. 6, the predicted QoS KPI (illustrated with a dashed line) is compared to a first threshold Th1 during an analytics target period Ta and an analytic event is triggered when the predicted QoS KPI is lower than the first threshold Th1. Thus, two analytics events are triggered during the analytics target period Ta, one at a first time instance t1 and one at a second time instance t2.

According to embodiments of the invention procedures for suppressing an analytics event in the notification related to the analytics event for specific NF consumers are introduced. The procedures are performed between the first network node wo and the second network node 300, where the first network node wo may be seen as a controlling function and the second network node 300 may be seen as a controlled function. The procedures are based on a list of NF consumers subscribing to an analytics event and their respective notification status associated with the analytics event. Depending on the order and status of the NF consumers in the list of NF consumers, the second network node 300 may transmit or suppress an analytics event in notifications associated with the analytics event to the NF consumers.

Figure 7:
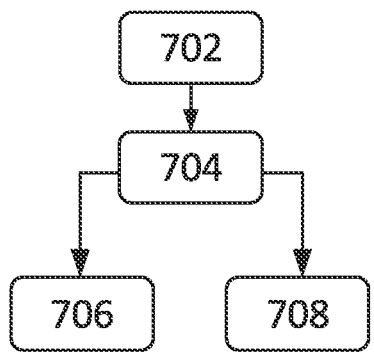
FIG. 7 shows a method for a second network node according to an embodiment of the invention.

FIG. 7 shows a flow chart of a method 700 according to embodiments of the invention. The method 700 may be performed in the second network node 300 with a list of NF consumers subscribing to an analytics event and their respective notification status associated with the analytics event.

In step 702, the second network node 300 detects an analytics event. Upon detecting the analytics event, the second network node 300 checks in step 704 the notification status associated with the analytics event for the NF consumer from the list of NF consumers. The notification status may be a first status in which the NF consumer receives a first notification type indicating an action is needed to be performed by the NF consumer in respect of the analytics event, or a second status in which the NF consumer receives a second notification type inhibiting an action to be performed by the NF consumer in respect of the analytics event.

If the status of the NF consumer is the first status, the second network node 300 transmits the first notification type to the NF consumer in step 706. On the other hand, if the status of the NF consumer is the second status, the second network node 300 transmits the second notification type to the NF consumer in step 708.

The method 700 is repeated for each NF consumer in the list of NF consumers. Thus, the second network node 300 transmits the first notifications and the second notifications to the NF consumers according to the list of NF consumers. In this way, the NF consumers set to the first status in the list of NF consumers receives the first notification type indicating an action is needed to be performed by the NF consumer in respect of the analytics event, while the NF consumers set to the second status in the list of NF consumers receives the second notification type inhibiting an action to be performed by the NF consumer in respect of the analytics event.

In embodiments, the first notification type may indicate the analytics event and the second notification type may not indicate the analytics event, i.e. the analytics event is suppressed in the second notification type. Both the first notification type and the second notification type may further comprise additional information such as e.g. analytics information as defined in the 3GPP standard.

According to embodiments of the invention the NF consumers in the list may further be set to a third status. Each NF consumer in the list may hence be set to the first status, the second status, or the third status. In the third status the NF consumer may receive the first notification type and may perform or initiate an action upon an acknowledgement of an action performed by a previous NF consumer in the list of NF consumers. The acknowledgement of the action performed by the previous NF consumer may be indicated in a message received by the second network node 300 from the previous NF consumer. With the third status a sequential and conditional order of actions among the NF consumers can be achieved. For example, a NF consumer set to the third status may receive the first notification type if a previous NF consumer provides an acknowledgement and may receive the second notification type if the previous NF consumer provides no acknowledgement or a negative acknowledgement.

In embodiments, the NF consumers may be ordered in a chronological order in the list of NF consumers for receiving notifications. The sequential order of notifications and actions may hence be determined according to the chronological order in the list of NF consumers. In contrast the first status may be seen as a parallel mode, i.e. the first type of notifications is sent to all the NF consumers which are set to the first status at essentially the same time.

Figure 8:
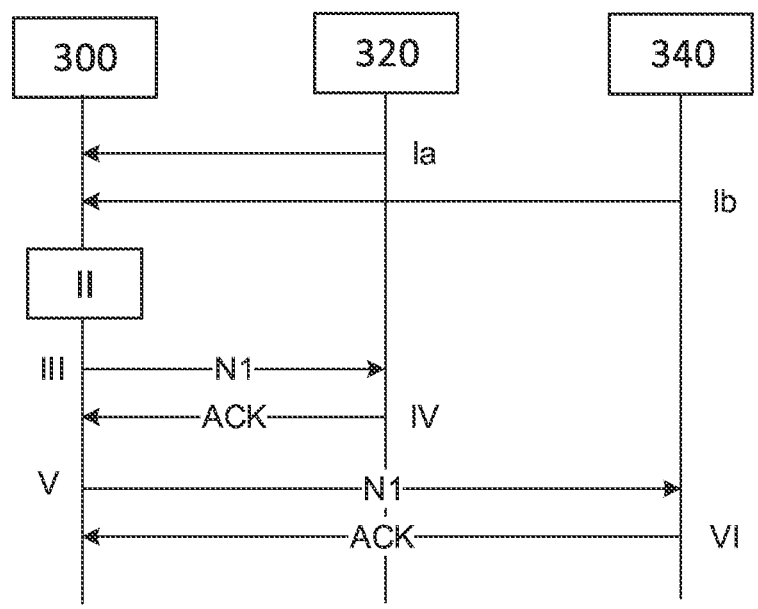
FIG. 8 shows signalling between a second network node, a first NF consumer, and a second NF consumer according to an embodiment of the invention.

FIG. 8 shows signaling between the second network node 300, a first NF consumer 320, and a second NF consumer 340 according to embodiments where the first NF consumer 320 is set to the first status and the second NF consumer 340 is set to the third status. In step Ia and Ib in FIG. 8, the first NF consumer 320 and the second NF consumer 340 subscribes to an analytics event, respectively. The first NF consumer 320 and the second NF consumer 340 subscribes to the same analytics event.

In step II in FIG. 8, the second network node 300 derives the analytics and monitors for the analytics event. Upon detecting an analytics event, the second network node 300 transmits a first notification N1 to the first NF consumer 320, as shown in step III in FIG. 8. The second network node 300 transmits the first notification N1 based on the status of the first NF consumer in the list of NF consumers, i.e. based on that the first NF consumer 320 is set to the first status. The first notification N1 indicates that an action is needed to be performed by the first NF consumer 320 in respect of the analytics event.

The first NF consumer 320 receives the first notification N1 indicating the action that the first NF consumer 320 needs to perform. Based on the correct reception and processing by the first NF consumer 320 of the first notification N1, the first NF consumer 320 transmits an acknowledgement ACK to the second network node 320 in step IV.

Upon receiving the acknowledgement ACK from the first NF consumer 320, the second network node 300 checks the content of the acknowledgement ACK and transmits a first notification N1 to the second NF consumer 340, as shown in step V in FIG. 8. The second network node 300 transmits the first notification N1 based on the status of the second NF consumer 340 in the list of NF consumers, i.e. based on that the second NF consumer 340 is set to the third status, and further based on the acknowledgement ACK from the first NF consumer 320. If the acknowledgement ACK indicates that an action is needed by a further NF consumer, the first notification N1 may be of the first notification type and hence indicates that an action is needed to be performed by the second NF consumer 340 in respect of the analytics event. If the acknowledgement ACK indicates that no action is needed by any further NF consumers, the first notification N1 may be of the second notification type and hence inhibits an action to be performed by the NF consumer in respect of the analytics event.

In the same way as for the first NF consumer 320, the second NF consumer 340 receives the first notification N1 and transmits an acknowledgement ACK to the second network node 300 based on the correct reception and processing by the second NF consumer 340 of the first notification N1, as shown in step VI in FIG. 8.

Figure 9:
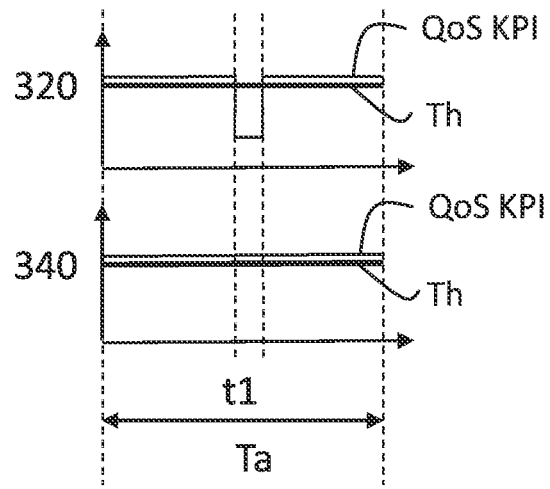
FIG. 9 shows notifications from the second network node according to an embodiment of the invention.

FIG. 9 shows notifications related to QoS sustainability analytics from the second network node 300 to a first NF consumer 320 and a second NF consumer 340 according to embodiments of the invention. The first NF consumer 320 and the second NF consumer 340 have subscribed to the second network node 300 for the same analytics event. In the embodiment shown in FIG. 9, the analytics event is based on a single threshold Th related to a QoS KPI, where an analytic event is detected when the QoS KPI is predicted to be below the threshold Th. However, only the first NF consumer 320 is supposed to react to the analytics event. Therefore, the first NF consumer 320 is set to the first status, while the second NF consumer 340 is set to the second status. The status and the order of the NF consumer in the list of NF consumers may be set by the first network node 100, e.g. using the signaling described with reference to FIG. 13, or by the second network node 300 according to a policy provided by the first network node 100.

With reference to FIG. 9, the QoS KPI is monitored or predicted during an analytics target period Ta. At a first time instance t1, the second network node 300 determines that the QoS KPI will be below the threshold Th. Based on the statuses of the NF consumers 320, 340 in the list of NF consumers, the second network node 300 notifies the first NF consumer 320 about the detected analytics event at the first time instance t1 but suppresses the detected analytics event in the notification to the second NF consumer 340, as illustrated in FIG. 9 where the QoS KPI reported to the first NF consumer 320 and the second NF consumer 340, respectively, is shown. The second network node 300 may hence send analytics such as the predicted QoS KPI to both the NF consumers 320, 340 but the notification of the detected analytics event only to the first NF consumer 320.

Figure 10:
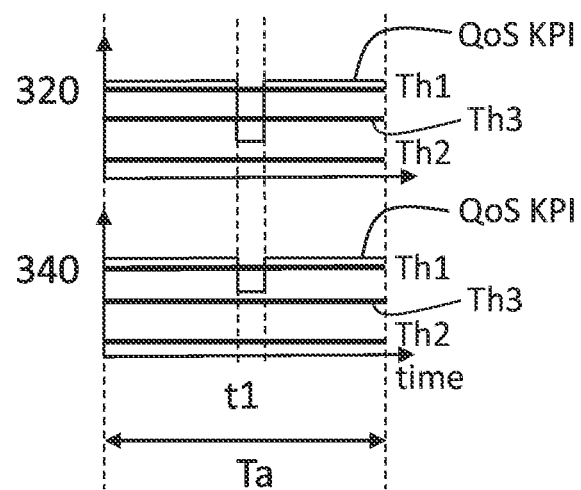
FIG. 10 shows notifications from the second network node according to an embodiment of the invention.

FIG. 10 shows notifications related to QoS sustainability analytics from the second network node 300 to a first NF consumer 320 and a second NF consumer 340 according to embodiments of the invention where multiple thresholds are used. A QoS KPI is monitored or predicted against a first threshold Th1, a second threshold th2, and a third threshold Th3 during an analytics target period Ta. The third threshold Th3 is further configured as the standard threshold. In FIG. 10, an analytics event is detected when the QoS KPI is detected or predicted to cross any of the defined thresholds (Th1, Th2 or Th3) in the critical direction during the analytics target period (or time interval) Ta. Thus, an analytics event is detected at a first time instance t1 in FIG. 10. The second network node 300 transmits a notification of the analytics event depending on the status of the NF consumers in the list of NF consumers. If the status of the NF consumer is set to the first status, the second network node 300 sends the first notification type to the NF consumer in which the analytics event is not suppressed. Therefore, the QoS KPI is reported to the NF consumer to be below the third threshold Th3 and above the second threshold Th2, as it is actually predicted or detected by the second network node 300. If the status of the NF consumer is set to the second status, the analytics event is suppressed in the notification that is sent to the NF consumer by the second network node 300, i.e. the second network node 300 sends the second notification type to the NF consumer. Therefore, the QoS KPI is reported to be within the third threshold Th3 (in the critical direction), which is configured as the standard threshold.

Figure 11:
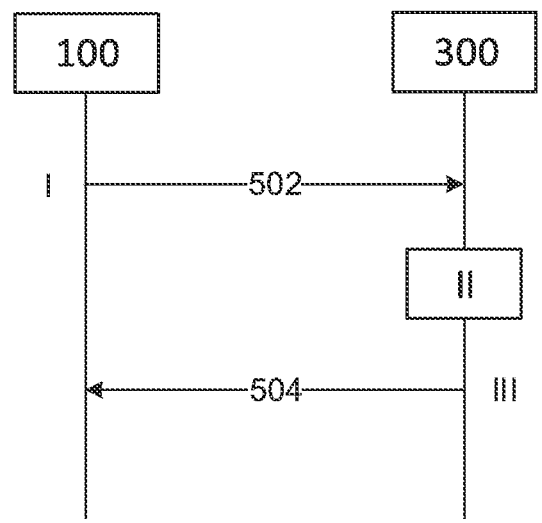
FIG. 11 shows signaling between the first network node and the second network node for establishing a list of NF consumers according to an embodiment of the invention.

Procedures for establishing and updating the list of NF consumers between the first network node 100 and the second network node 300 are introduced. FIG. 11 shows signaling between the first network node 100 and the second network node 300 for establishing a list of NF consumers according to embodiments of the invention.

In step I in FIG. 11, the first network node 100 transmits a get list request message 502 to a second network node 300. The get list request message 502 indicates a request for a list of NF consumers subscribing to an analytics event. The analytic event may be indicated with an analytics ID, analytics filter information, and/or other information such as e.g. parameters associated with an analytics subscription. The analytics ID may indicate the type of analytics In case of QoS sustainability analytics, the analytics filter information may indicate information such as e.g. any one or more of QoS requirements, location information, observation period, threshold(s), and single network slice selection assistance information (S-NSSAI).

The second network node 300 receives the get list request message 502 indicating the request for the list of NF consumers subscribing to an analytics event from the first network node 100. Based on the get list request message 502, the second network node 300 determines a list of NF consumers and their respective notification status associated with the subscribed analytics event in step II in FIG. 11. As previously described, each NF consumer in the list may be set to the first status, the second status, or the third status. The NF consumers in the list may further be ordered in a chronological order for receiving notifications. The second network node 300 may further include a unique identifier for each NF consumer in the list. The unique identifier be used by the first network node 100 to determine both the type of NF consumer and also the specific NF instance.

In step III in FIG. 1i, the second network node 300 transmits a get list response message 504 to the first network node 100. The get list response message 504 indicates the determined list of NF consumers and their respective notification status associated with the subscribed analytics event.

The first network node 100 receives the get list response message 504 from the second network node 300 and may hence obtain the list of NF consumers and their respective notification status associated with the analytics event indicated in the get list response message 504. From the list of NF consumers the first network node 100 may obtain the order in which the NF consumers receives the notifications according to their respective status.

Figure 12:
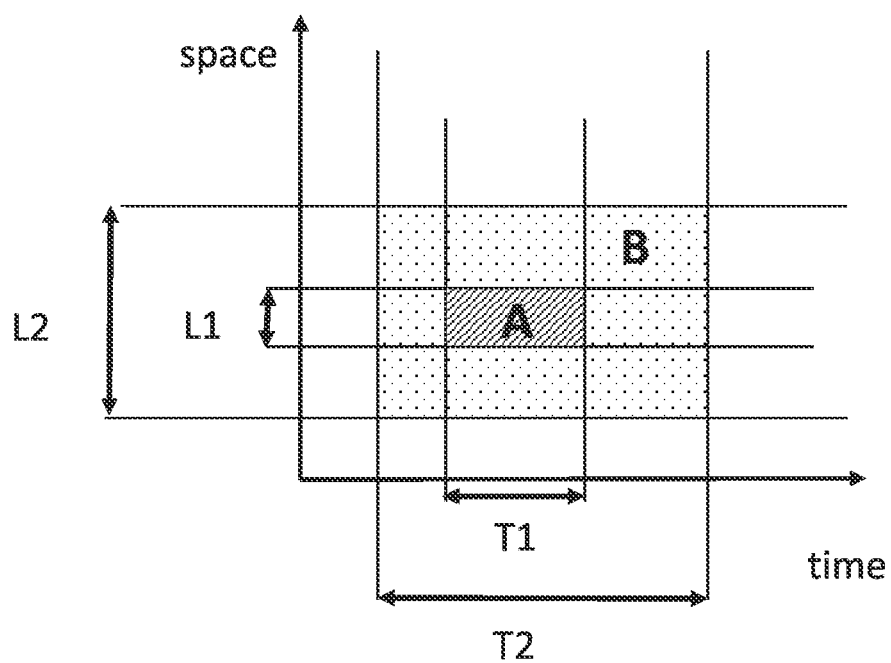
FIG. 12 shows overlapping analytics event sets according to an embodiment of the invention.

In embodiments the list of NF consumers may comprise NF consumers who have subscribed to the second network node 300 with different analytics filter information but with overlapping analytics event sets. An event set may be defined as a class of analytics events that may originate during the lifetime of an analytics subscription of an NF consumer. FIG. 12 shows two such overlapping analytics event sets, a first event set A and a second event set B. Two NF consumers have subscribed to QoS sustainability analytics with the same QoS requirements, S-NSSAI, and threshold(s), but with different locations and observation periods. Two NF consumer has subscribed to a first event set A and one NF consumer has subscribes to a second event set B. The first event set A is associated with a first location L1 and a first observation period T1 and the second event set B is associated with a second location L2 and a second observation period T2. With reference to FIG. 12, the second location L2 overlap the first location L1 and the second observation period T2 overlap the first observation period T1 such that the first event set A is a subset of the second event set B. Table 1 shows further details related to the overlapping first event set A and second event set B.

TABLE 1

| Event set | Observation period | Location | NF Consumers |
|---|---|---|---|
| A | $T_1$ | $L_1$ | 2 |
| B | $T_2$ (excluding interval of $T_1$) | $L_1$ | 1 |
|   | $T_2$ (excluding interval of $T_1$) | $L_2$ (excluding region marked as $L_1$) | 1 |
|   | $T_1$ | 2 (excluding region marked as $L_1$) | 1 |

According to embodiments of the invention the first network node 100 may modify the list of NF consumers for a specific analytics event, e.g. identified with a specific set of analytics filter information. The first network node 100 may for each NF consumer change the status and/or the order in the list of NF consumers. However, the first network node 100 may in embodiments not remove and/or add NF consumers from and/or to the list of NF consumers as this should be done only via the subscription mechanism between the second network node 300 and the NF consumers.

Figure 13:
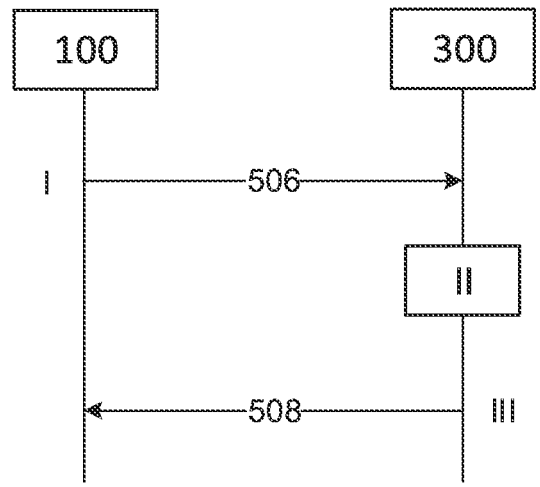
FIG. 13 shows signaling between the first network node and the second network node for modifying a list of NF consumers according to an embodiment of the invention.

FIG. 13 shows signaling between the first network node 100 and the second network node 300 for modifying a list of NF consumers according to embodiments of the invention. In step I in FIG. 13, the first network node 100 transmits a set list request message 506 to the second network node 300. The set list request message 506 may indicate a chronological order of NF consumers in the list for receiving notifications and their respective status. The set list request message 506 may further indicate the status of the NF consumers in the list. As for the get list request message 502, the set list request message 506 may indicate the analytics event with an analytics ID and/or analytics filter information which allows the second network node 300 to identify the analytics event. In embodiments, the first network node 100 may compile the list of NF consumers based on a list of NF consumers and their respective notification status associated with the analytics event indicated in a get list response message 504 previously received from the second network node 300. The NF consumers in the set list may in this case be identified using identifiers that where retrieved from the get list response message 504.

The second network node 300 receives the set list request message 506 from the first network node 100 and hence may obtain the chronological order of NF consumers for receiving notifications and their respective status indicated in the set list request message 506. In step II in FIG. 13, the second network node 300 determines the list of NF consumers based on the set list request message 506 and further determines an acknowledgement or a negative acknowledgement response based on the determined list of NF consumers. The second network node 300 may further determines the list of NF consumers based on the subscription received from the NF consumers.

The second network node 300 may determine a negative acknowledgement if the list of NF consumers received in the set list request message 506 is invalid, e.g. if the list of NF consumers received in the set list request message 506 does not match the list of NF consumers in the second network node 300. A potential reason for such a mismatch could be that one or more of the NF consumers in the list provided by the first network node 100 has cancelled its subscription, or new NF consumers had subscribed for the same or overlapping analytics event before the first network node 100 transmitted the set list request message 506.

In step III in FIG. 13, the second network node 300 transmits a set list response message 508 to the first network node 100. The set list response message 508 indicates the acknowledgement or the negative acknowledgement response to the set list request message 506. Thus, the first network node 100 receives the set list response message 508 from the second network node 300, wherein the set list response message 508 indicates an acknowledgement or a negative acknowledgement response to the set list request message 506. If the first network node 100 receives the negative acknowledgement response, the first network node 100 may update the NF consumers list from the second network node 300.

According to embodiments of the invention a policy is used which allows the second network node 300 to update the list of NF consumers automatically. The policy is associated with a list of NF consumers and may be a set of rules that the second network node 300 uses to set the order of the NF consumers in the list and their respective notification status. Table 2 shows an example of a structure of a policy associated with a list of NF consumers.

TABLE 2

| Information name | Description | Category | The first network node 100 permitted to modify in an event set | Scope |
|---|---|---|---|---|
| NF consumer type precedence | Determines the order of the NF consumer in the list of NF consumers. | Mandatory | Yes | Event set |
| NF consumer type status | Determines the status of the NF consumer in the list of NF consumers. | Mandatory | Yes | Event set |
| Time window | The time window where the policy is applicable. | Optional | Yes | Event set |
| Location Criteria | The location where the policy is applicable. | Optional | Yes | Event set |

Figure 14:
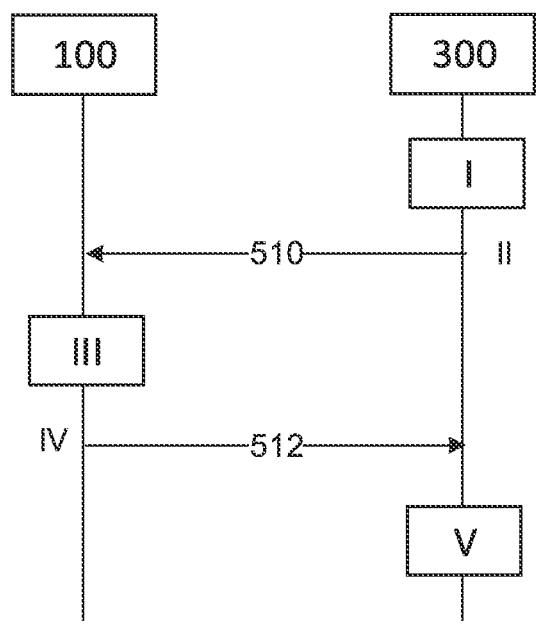
FIG. 14 shows signaling between the first network node and the second network node for establishing a policy according to an embodiment of the invention.

FIG. 14 shows signaling between the first network node 100 and the second network node 300 for establishing a policy in the second network node 300 according to embodiments of the invention. In the embodiment shown in FIG. 14, the second network node 300 initiates the procedure for establishing the policy.

In step I in FIG. 14, the second network node 300 determines to establish a policy associated with a list of NF consumers. The second network node 300 may determine to establish the policy e.g. if the second network node 300 has not yet obtained a policy for the list of NF consumers or the policy for the list of NF consumers is no longer valid. The determination may be based on local policies in the second network node 300.

In step II in FIG. 14, the second network node 300 transmits a policy request message 510 to the first network node 100, wherein the policy request message 510 indicates a request for a policy associated with the list of NF consumers. In embodiments, the policy request message 510 may include at least one of analytics ID and analytics filter information. In this way, specific policies for an analytics ID or for a specific analytics event set according to the supplied analytics filter information can be requested. If the policy request message 510 does not contain analytics ID and analytics filter information a system wide policy may be requested.

The first network node 100 receives the policy request message 510 from the second network node 300, wherein the policy request message 510 indicates the request for a policy associated with the list of NF consumers. Based on the received policy request message 510, first network node 100 establishes a policy associated with the list of NF consumers in step III in FIG. 14.

In step IV in FIG. 14, the first network node 100 transmits a policy response message 512 the second network node 300, wherein the policy response message 512 indicates the established policy associated with the list of NF consumers. The policy response message 512 may comprise a policy association ID and policy information associated with the list of NF consumers.

The second network node 300 receives the policy response message 512 from the first network node 100, wherein the policy response message 512 indicates the policy associated with the list of NF consumers. In step V in FIG. 14, the second network node 300 determines the list of NF consumers and their respective notification status based on the policy associated with the list of NF consumers. The second network node 300 may further consider the subscriptions received from the NF consumers when determining the list of NF consumers and their respective notification status.

In embodiments, an established policy associated with a list of NF consumers may be updated using an update mechanism. The update mechanism may be initiated by the first network node 100 or the second network node 300.

Figure 15:
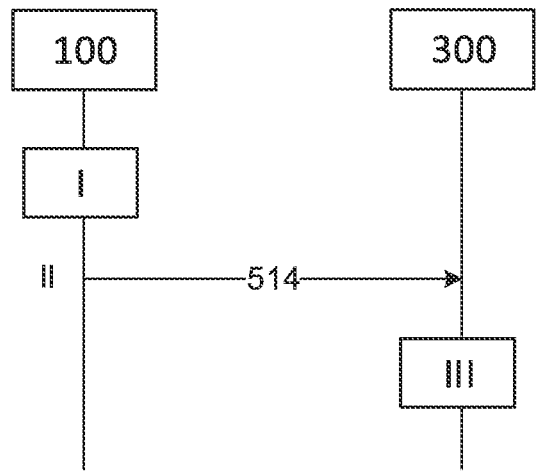
FIG. 15 shows signaling between the first network node and the second network node for updating a policy according to an embodiment of the invention.

FIG. 15 shows signaling between the first network node 100 and the second network node 300 for updating of a policy, when the updating of the policy is initiated by the first network node 100. In step I in FIG. 15, the first network node 100 determines to update a policy associated with a list of NF consumers. The first network node 100 may determine to update the policy based on a local decision that the policy should be modified. For example, the first network node 100 may determine to update the policy because the operator has defined new information that may trigger a policy update or because of internal triggering in the first network node 100. The update of the policy may e.g. update rules to determine the relative priority/order of NF consumers in receiving the analytics notification, as well as rules to determine to which status the NF consumers can be set.

In step II in FIG. 15, the first network node 100 transmits a policy update message 514 to the second network node 300, wherein the policy update message 514 indicates the updated policy associated with the list of NF consumers. The policy update message 514 may indicate the updated policy with a policy association ID and may further indicate policy information associated with the list of NF consumers.

The second network node 300 receives the policy update message 514 from the first network node 100, wherein the policy update message 514 indicates the updated policy. In step III in FIG. 15, the second network node 300 determines the list of NF consumers and their respective notification status based on the updated policy. The second network node 300 may further consider the subscriptions received from the NF consumers when determining the list of NF consumers and their respective notification status. The policy may refer to one or more analytics events and the policy update may trigger updating of all the lists in all the impacted analytics events.

Figure 16:
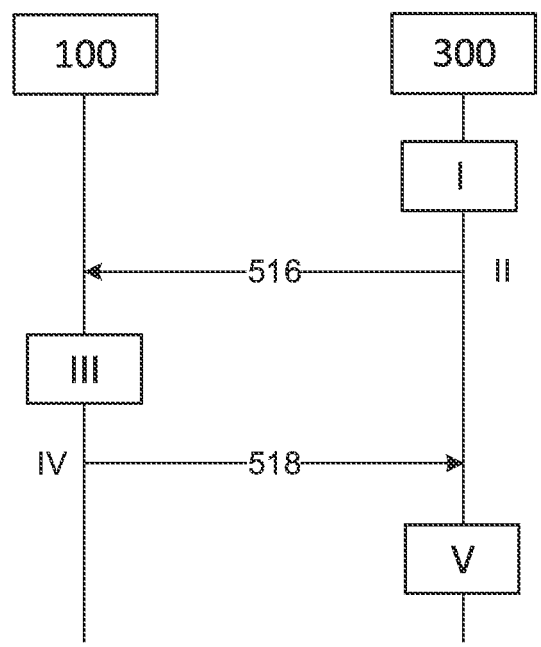
FIG. 16 shows signaling between the first network node and the second network node for updating a policy according to an embodiment of the invention.

FIG. 16 shows signaling between the first network node 100 and the second network node 300 for updating of a policy, when the updating of the policy is initiated by the second network node 300. In step I in FIG. 16, the second network node 300 determines to update a policy associated with a list of NF consumers. The second network node 300 may determine to update the policy based on a local decision that the policy should be modified. For example, the second network node 300 may determine to update the policy because a new type of NF consumer subscribes to a specific analytics event and the second network node 300 needs to know the priority for serving the new type of NF consumer in relation to other NF consumers, as well as if the relevant analytics events shall be suppressed or not for the new type of NF consumer for proper coordination.

In step II in FIG. 16, the second network node 300 transmits a policy update request message 516 to the first network node 100, wherein the policy update request message 516 indicates a request for an updated of the policy associated with the list of NF consumers. The policy update request message 516 may indicate the policy which the second network node 300 requests to be updated with a policy association ID.

The first network node 100 receives the policy update request message 516 from the second network node 300, wherein the policy update request message 516 indicates the request for the policy update. Based on the received policy update request message 516, the first network node 100 updates the policy associated with the list of NF consumers, in step III in FIG. 16. The update of the policy may e.g. trigger a change in the priority of different types of NF consumers or their status in the list of NF consumers.

In step IV in FIG. 16, the first network node 100 transmits a policy update response message 518 to the second network node 300, wherein the policy update response message 518 indicates the updated policy associated with the list of NF consumers.

The second network node 300 receives the policy update response message 518 from the first network node 100, wherein the policy update response message 518 indicates the updated policy associated with the list of NF consumers. In step V in FIG. 16, the second network node 300 deploys the policy. This may trigger updating of the list of NF consumers and their respective notification status based on the updated policy. The second network node 300 may further consider the subscriptions received from the NF consumers when determining the list of NF consumers and their respective notification status.

Figure 17:
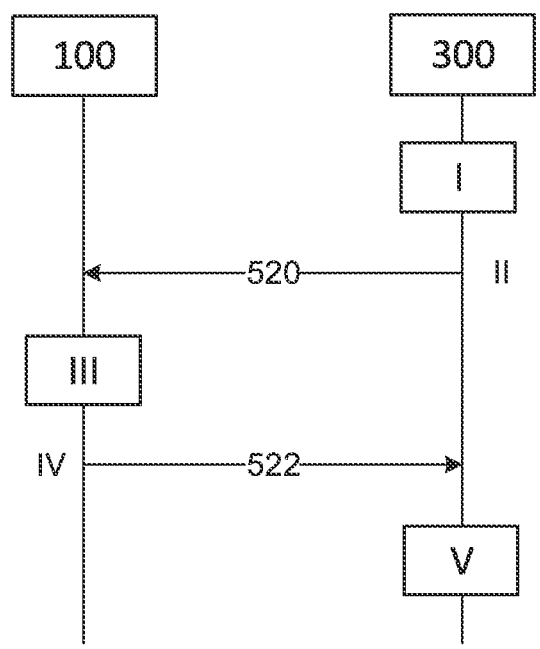
FIG. 17 shows signaling between the first network node and the second network node for terminating a policy according to an embodiment of the invention.

According to embodiments of the invention an established policy associated with a list of NF consumers may be further be terminated. FIG. 17 shows signaling between the first network node 100 and the second network node 300 for termination of a policy.

In step I in FIG. 17, the second network node 300 determines to terminate a policy associated with a list of NF consumers. The second network node 300 may determine to terminate the policy e.g. based on that the first network node 100 intends to create a new policy, some analytics events, that a NF consumer type is no longer supported, or that the analytics service is no longer provided.

In step II in FIG. 17, the second network node 300 transmits a terminate policy request message 520 to the first network node 100, wherein the terminate policy request message 520 indicates termination of the policy associated with the list of NF consumers. The terminate policy request message 520 may indicate the policy which the second network node 300 requests to be terminated with a policy association ID.

The first network node 100 receives the terminate policy request message 520 from the second network node 300, wherein the terminate policy request message 520 indicates termination of the policy associated with the list of NF consumers. Based on the received terminate policy request message 520, the first network node 100 terminates the policy associated with the list of NF consumers in step III in FIG. 17. The termination may include the first network node 100 removing the policy association with the analytics event.

In step IV in FIG. 17, the first network node 100 transmits a terminate policy response message 522 to the second network node 300, wherein the terminate policy response message 522 indicates the termination of the policy associated with the list of NF consumers. The terminate policy response message 522 may e.g. be an acknowledgment indicating that the termination of the policy in the first network node 100 has been successful.

The second network node 300 receives the terminate policy response message 522 from the first network node 100, wherein the terminate policy response message 522 indicates termination of a policy associated with the list of NF consumers. Based on the received terminate policy response message 522, the second network node 300 terminates the policy associated with the list of NF consumers, in step V in FIG. 17. The termination may include the second network node 300 removing the policy association for the relevant analytics events and further deleting the subscription to detected analytics events requested for that policy association.

The first network node 100 herein may be denoted as a policy control function (PCF) or a policy control and rule function (PCRF). The PCF or PCRF may be a function configured for communication in 3GPP related LTE and LTE-Advanced, in WiMAX and its evolution, and in fifth generation wireless technologies, such as new radio (NR).

The second network node 300 herein may be denoted as a network data analytics function (NWDAF). The NWDAF may be a function configured for communication in 3GPP related LTE and LTE-Advanced, in WiMAX and its evolution, and in fifth generation wireless technologies, such as new radio (NR).

The NF consumer herein may be denoted as a session management function (SMF), an access and management function (AMF), a policy control function (PCF), an application function (AF), a radio access networks (RAN), or a user equipment (UE). These functions or nodes may be configured for communication in 3GPP related LTE and LTE-Advanced, in WiMAX and its evolution, and in fifth generation wireless technologies, such as new radio (NR).

Furthermore, any method according to embodiments of the invention may be implemented in a computer program, having code means, which when run by processing means causes the processing means to execute the steps of the method. The computer program is included in a computer readable medium of a computer program product. The computer readable medium may comprise essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that embodiments of the first network node 100 and the second network node 300 comprises the necessary communication capabilities in the form of e.g., functions, means, units, elements, etc., for performing the solution. Examples of other such means, units, elements and functions comprise: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the solution.

Especially, the processor(s) of the first network node 100 and the second network node 300 may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the invention is not limited to the embodiments described above, but also relates to and incorporates all embodiments within the scope of the appended independent claims.

What is claimed is:

1. A method, comprising:
    transmitting, by a first network node, a get list request message to a second network node, wherein the get list request message indicates a request for a list of network function (NF) consumers subscribing to an analytics event; and
    receiving, by the first network node, a get list response message from the second network node,
    wherein the get list response message indicates a list of NF consumers, and, for each NF consumer on the list of NF consumers, a notification status of the respective NF consumer associated with the analytics event,
    wherein each NF consumer in the list of NF consumers is set:
        to a first status in which the respective NF consumer receives a first notification having a first notification type indicating an action is needed to be performed by the respective NF consumer corresponding to the analytics event, or
        to a second status in which the respective NF consumer receives a second notification having a second notification type inhibiting an action to be performed by the respective NF consumer corresponding to the analytics event, or
        to a third status corresponding to the analytics event, wherein:
            the third status is a status in which the respective NF consumer receives the first notification having the first notification type and performs the action upon an acknowledgement of an action performed by a previous NF consumer in the list of NF consumers.

2. The method according to claim 1, wherein the NF consumers are ordered in a chronological order in the list of NF consumers for receiving notifications.

3. The method according to claim 1, further comprising:
transmitting, by the first network node, a set list request message to the second network node, wherein the set list request message indicates a chronological order of NF consumers in a list for receiving notifications, and for each NF consumer in the list, a status of the respective NF consumer; and
receiving, by the first network node, a set list response message from the second network node, wherein the set list response message indicates an acknowledgement or a negative acknowledgement response to the set list request message.

4. The method according to claim 1, further comprising:
receiving, by the first network node, a policy request message from the second network node, wherein the policy request message indicates a request for a policy associated with the list of NF consumers;
establishing, by the first network node, a policy associated with the list of NF consumers; and
transmitting, by the first network node, a policy response message to the second network node, wherein the policy response message indicates the established policy associated with the list of NF consumers.

5. The method according to claim 1, further comprising:
updating, by the first network node, a policy associated with the list of NF consumers; and
transmitting, by the first network node, a policy update message to the second network node, wherein the policy update message indicates the updated policy associated with the list of NF consumers.

6. The method according to claim 1, further comprising:
sending, by the second network node, the get list response message to the first network node.

7. The method according to claim 1, comprising:
receiving, by a second network node, the get list request message from the first network node;
determining, by the second network node, the list of NF consumers and, for each NF consumer in the list of NF consumers, the notification status of the respective NF consumer associated with the subscribed analytics event; and
transmitting, by the second network node, the get list response message to the first network node.

8. The method according claim 7, comprising:
transmitting, by the second network node, first notifications of the first notification type and second notifications of the second notification type to the NF consumers according to the list of NF consumers.

9. The method according to claim 7, further comprising:
receiving, by the second network node, a set list request message from the first network node, wherein the set list request message indicates a chronological order of NF consumers for receiving notifications and the respective notification status of each NF consumer;
determining, by the second network node, the list of NF consumers based on the set list request message;
determining, by the second network node, an acknowledgement or a negative acknowledgement response based on the determined list of NF consumers; and
transmitting, by the second network node, a set list response message to the first network node, wherein the set list response message indicates the acknowledgement or the negative acknowledgement response to the set list request message.

10. The method according to claim 7, further comprising:
transmitting, by the second network node, a policy request message to the first network node, wherein the policy request message indicates a request for a policy associated with the list of NF consumers;
receiving, by the second network node, a policy response message from the first network node, wherein the policy response message indicates a policy associated with the list of NF consumers; and
determining, by the second network node, the list of NF consumers and the respective notification status of each NF consumer based on the policy associated with the list of NF consumers.

11. The method according to a claim 7, further comprising:
receiving, by the second network node, a policy update message from the first network node, wherein the policy update message indicates an updated policy; and
determining, by the second network node, the list of NF consumers and the respective notification status of each NF consumer based on the updated policy.

12. The method according to claim 7, further comprising:
transmitting, by the second network node, a policy update request message to the first network node, wherein the policy update request message indicates a request for an update of a policy associated with the list of NF consumers;
receiving, by the second network node, a policy update response message from the first network node, wherein the policy update response message indicates an updated policy associated with the list of NF consumers; and
determining, by the second network node, the list of NF consumers and the respective notification status of each NF consumer based on the updated policy.

13. The method according to claim 7, further comprising:
transmitting, by the second network node, a terminate policy request message to the first network node, wherein the terminate policy request message indicates termination of a policy associated with the list of NF consumers;
receiving, by the second network node, a terminate policy response message from the first network node, wherein the terminate policy response message indicates termination of a policy associated with the list of NF consumers; and
terminating, by the second network node, the policy associated with the list of NF consumers.

14. A method, comprising:
transmitting, by a first network node, a get list request message to a second network node, wherein the get list request message indicates a request for a list of network function (NF) consumers subscribing to an analytics event;
receiving, by the second network node, the get list request message; and
transmitting, by the second network node, a get list response message to the first network node, wherein the get list response message indicates the list of NF consumers, and, for each NF consumer on the list of NF consumers, a notification status of the respective NF consumer associated with the analytics event, wherein each NF consumer in the list of NF consumers is set to:

a first status in which the respective NF consumer receives a first notification having a first notification type indicating an action is needed to be performed by the respective NF consumer corresponding to the analytics event, or a second status in which the respective NF consumer receives a second notification having a second notification type inhibiting an action to be performed by the respective NF consumer corresponding to the analytics event, or a third status corresponding to the analytics event, wherein:

the third status is a status in which the respective NF consumer receives the first notification type and performs the action upon an acknowledgement of an action performed by a previous NF consumer in the list of NF consumers.

15. The method according to claim 14, wherein the NF consumers are ordered in a chronological order in the list of NF consumers for receiving notifications.

16. The method according to claim 14, further comprising:

transmitting, by the first network node, a set list request message to the second network node, wherein the set list request message indicates a chronological order of NF consumers in a list for receiving notifications, and for each NF consumer in the list, a status of the respective consumer; and receiving, by the first network node, a set list response message from the second network node, wherein the set list response message indicates an acknowledgement or a negative acknowledgement response to the set list request message.

17. The method according to claim 14, further comprising:

receiving, by the first network node, a policy request message from the second network node, wherein the policy request message indicates a request for a policy associated with the list of NF consumers;

establishing, by the first network node, a policy associated with the list of NF consumers; and transmitting, by the first network node, a policy response message the second network node, wherein the policy response message indicates the established policy associated with the list of NF consumers.

18. The method according to claim 14, further comprising:

updating, by the first network node, a policy associated with the list of NF consumers; and transmitting, by the first network node, a policy update message to the second network node, wherein the policy update message indicates the updated policy associated with the list of NF consumers.

19. An apparatus, comprising:

one or more processors; and one or more non-transitory computer-readable media storing programming for execution by the one or more processors, the programming comprising instructions to transmit a get list request message to a second network node, wherein the get list request message indicates a request for a list of network function (NF) consumers subscribing to an analytics event; and receive a get list response message from the second network node, wherein:

the get list response message indicates a list of NF consumers, and for each NF consumer on the list of NF consumers, a notification status of the respective NF consumer associated with the analytics event, wherein each NF consumer in the list of NF consumers is set:

to a first status in which the respective NF consumer receives a first notification having a first notification type indicating an action is needed to be performed by the respective NF consumer corresponding to the analytics event, or to a second status in which the respective NF consumer receives a second notification having a second notification type inhibiting an action to be performed by the respective NF consumer corresponding to the analytics event, or to a third status corresponding to the analytics event, wherein:

the third status is a status in which the respective NF consumer receives the first notification having the first notification type and performs the action upon an acknowledgement of an action performed by a previous NF consumer in the list of NF consumers.

20. A system, comprising:

a first network node configured to:

transmit a get list request message to a second network node, wherein the get list request message indicates a request for a list of network function (NF) consumers subscribing to an analytics event; and the second network node configured to:

receive the get list request message; and transmit a get list response message to the first network node, wherein the get list response message indicates a the list of NF consumers, and, for each NF consumer on the list of NF consumers, a notification status of the respective NF consumer associated with the analytics event, wherein each NF consumer in the list of NF consumers is set to:

a first status in which the respective NF consumer receives a first notification having a first notification type indicating an action is needed to be performed by the respective NF consumer corresponding to the analytics event, or a second status in which the respective NF consumer receives a second notification having a second notification type inhibiting an action to be performed by the respective NF consumer corresponding to the analytics event, or a third status corresponding to the analytics event, wherein:

the third status is a status in which the respective NF consumer receives the first notification type and performs the action upon an acknowledgement of an action performed by a previous NF consumer in the list of NF consumers.

* * * * *